US009081179B2

(12) United States Patent
Matsuura et al.

(10) Patent No.: US 9,081,179 B2
(45) Date of Patent: Jul. 14, 2015

(54) HEAD-UP DISPLAY DEVICE

(75) Inventors: Kazuya Matsuura, Niigata (JP); Maiko Saito, Niigata (JP); Hiroteru Haruyama, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 0 days.

(21) Appl. No.: 14/007,195

(22) PCT Filed: Feb. 10, 2012

(86) PCT No.: PCT/JP2012/053123
§ 371 (c)(1), (2), (4) Date: Sep. 24, 2013

(87) PCT Pub. No.: WO2012/132579
PCT Pub. Date: Oct. 4, 2012

(65) Prior Publication Data

US 2014/0022645 A1 Jan. 23, 2014

(30) Foreign Application Priority Data

Mar. 25, 2011 (JP) ................................ 2011-067426

(51) Int. Cl.
*G02B 27/10* (2006.01)
*G03H 1/00* (2006.01)
(Continued)

(52) U.S. Cl.
CPC .......... *G02B 27/0101* (2013.01); *G02B 3/0006* (2013.01); *G02B 5/02* (2013.01);
(Continued)

(58) Field of Classification Search
CPC ........... G02B 27/0172; G02B 27/0101; G02B 2027/0178; G02B 2027/0132; G02B 2027/011; G02B 27/01
USPC ................. 359/626, 630, 409–410, 462, 466, 359/638–639, 13–14, 603–636, 404, 407; 348/115; 345/7, 9, 156; 349/11; 701/1; 310/49 R, 156.32, 156.33, 156.34, 310/156.35, 266–268, 156.02; 340/438, 340/980, 995.1, 815.47, 815.74
See application file for complete search history.

(56) References Cited

U.S. PATENT DOCUMENTS 5,278,532 A * 1/1994 Hegg et al. ........................ 345/7
2004/0196253 A1* 10/2004 Eichenlaub .................. 345/102
(Continued)

FOREIGN PATENT DOCUMENTS

JP 2002-031845 A 1/2002
JP 2007-058163 A 3/2007
(Continued)

OTHER PUBLICATIONS

International Search Report in PCT/JP2012/053123 dated Mar. 13, 2012 with English Translation.

*Primary Examiner* — Dawayne A Pinkney
(74) *Attorney, Agent, or Firm* — McDermott Will & Emery LLP

(57) ABSTRACT

A head-up display device which can improve light irradiation efficiency toward an eye box, suppress the amount of brightness change for a display image affected by the movement of the viewpoint, and achieve desirable properties for the light distribution angle. An illumination optical system of the head-up display device has a light source for emitting a light beam, a lens array for generating a plurality of images of the light source by dividing the light beam, and a field lens for irradiating on a display member at a given angle the light beam emitted from the image of the light source, which is generated by the lens array, wherein the lens array is arranged such that the imaging surface of the light source generated by the lens array is located on the side of the principal point of the field lens with respect to a focal point on the side of an object of the field lens.

10 Claims, 2 Drawing Sheets

100 131 110 L 113 116a 112 116 120 115 115a 111c 114a 114 114b 115b 111b 111a 117 140 132 130 115c 111g 114c 111 111d

(51) Int. Cl.

| | |
|---|---|
| ***G02B 27/14*** | (2006.01) |
| ***H04N 7/00*** | (2011.01) |
| ***G09G 5/00*** | (2006.01) |
| ***G02F 1/1335*** | (2006.01) |
| ***G02B 27/01*** | (2006.01) |
| ***G02B 3/00*** | (2006.01) |
| ***G02B 5/02*** | (2006.01) |
| *G02F 1/1333* | (2006.01) |
| *G03B 21/28* | (2006.01) |

(52) U.S. Cl.

CPC ... *G02B2027/012* (2013.01); *G02B 2027/0118* (2013.01); *G02F 1/133603* (2013.01); *G02F 1/133608* (2013.01); *G02F 2001/133317* (2013.01); *G02F 2001/133607* (2013.01); *G02F 2001/133628* (2013.01); *G02F 2203/01* (2013.01); *G03B 21/28* (2013.01)

(56) References Cited

U.S. PATENT DOCUMENTS

| | | | | |
|---|---|---|---|---|
| 2007/0024977 | A1 | 2/2007 | Kawamura et al. | |
| 2011/0304825 | A1* | 12/2011 | Sieler et al. | 353/20 |

FOREIGN PATENT DOCUMENTS

| | | | |
|---|---|---|---|
| JP | 2007-121602 | A | 5/2007 |
| JP | 2008-209665 | A | 9/2008 |
| JP | 2009-169399 | A | 7/2009 |

* cited by examiner

HEAD-UP DISPLAY DEVICE

RELATED APPLICATIONS

This application is the U.S. National Phase under 35 U.S.C. §371 of International Application No. PCT/JP2012/053123, filed on Feb. 10, 2012, which in turn claims the benefit of Japanese Application No. 2011-067426, filed on Mar. 25, 2011, the disclosures of which Applications are incorporated by reference herein.

TECHNICAL FIELD

The present invention relates to a head-up display device.

BACKGROUND ART

Conventionally, various kinds of head-up display devices have been proposed. Such a head-up display device displays a virtual image by projecting a display light, which is emitted from a liquid crystal display provided with an illumination optical system including a light source and a liquid crystal display panel, on a viewpoint range (hereinafter, referred to also as an eye box) of an observer (mainly a driver in the case of a head-up display device for a vehicle), via a projecting member constituted by a windshield and a dedicated combiner of a vehicle. PTL 1 discloses an example of a conventional head-up display device. The head-up display device is provided with a condenser lens for converging an illumination light emitted from a light emitting element, a lenticular lens for spreading the illumination light converged by the condenser lens in at least lateral direction, and a converging lens having a toroidal surface, as an illumination optical system.

According to a head-up display device using the illumination optical system as described above, it is possible to transparently illuminate a display member so as to deal with an eye box of an observer. Therefore, it is possible to display a virtual image with high brightness.

CITATION LIST

Patent Literature

[PTL 1] JP-A-2009-169399

SUMMARY OF INVENTION

Technical Problem

However, it is difficult to control a light distribution of most of the light (particularly, the light advancing inclinedly in vertical and lateral directions at the same time, except for the light in so-called laterally and vertically inclined directions) in a direction inclined with respect to an optical axis, in the head-up display device using a lenticular lens. Therefore, light distribution intensity of the light in a direction inclined with respect to the optical axis is lower than that of the light in up, down, left and right directions with respect to the optical axis. Thus, there is a problem in that the amount of brightness change of a display image affected by a viewpoint movement of an observer is increased. In addition, light distribution angle properties different from that of a projector or the like are required in the head-up display device. Thus, it is necessary to achieve desirable light distribution angle properties.

An object of the present invention is to provide a head-up display device capable of improving light irradiation efficiency toward an eye box, suppressing the amount of brightness change for a display image affected by a movement of a viewpoint, and achieving desirable light distribution angle properties.

Solution to Problem

The present invention relates to a head-up display device for solving the problems described above. The head-up display device which displays a virtual image by introducing a display light, which is emitted from a display provided with an illumination optical system and a display member, to a viewpoint area of an observer via a projecting member, the illumination optical system having:

a light source for emitting a light beam, a lens array for generating a plurality of images of the light source by dividing the light beam, and a field lens for irradiating on the display member at a predetermined angle the light beam emitted from the images of the light source, which are generated by the lens array, in which the lens array is arranged such that the imaging surface of the light source generated by the lens array is located on a side of a principal point of the field lens with respect to a focal point on a side of an object of the field lens.

Advantageous Effects of Invention

According to the present invention, it is possible to improve light irradiation efficiency toward an eye box, suppress the amount of brightness change for a display image affected by a movement of a viewpoint, and achieve desirable light distribution angle properties.

DESCRIPTION OF EMBODIMENTS

Hereinafter, an embodiment of a vehicular head-up display device to which the present invention is applied will be described based on FIGS. 1 to 4.

Figure 1:
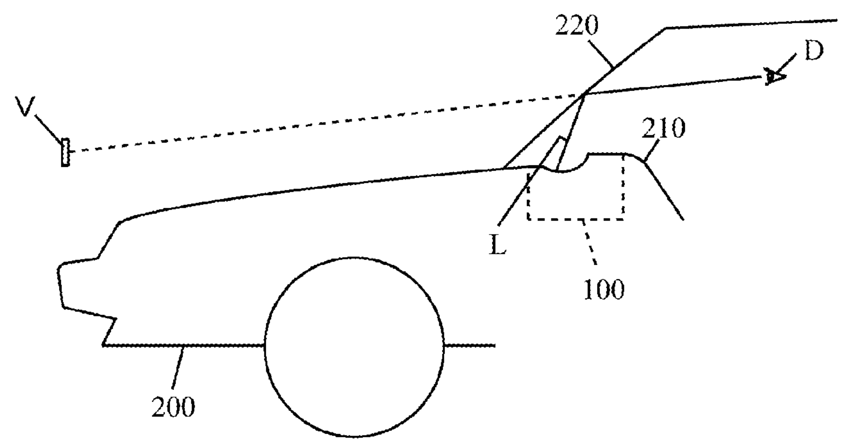
FIG. 1 is an overview of a head-up display device of an embodiment according to the present invention.

A head-up display device 100 is installed in an instrument panel 210 of a vehicle 200, as shown in FIG. 1. The head-up display device 100 displays a virtual image (display image) V by causing a display light L emitted from a liquid crystal display 110 described below to be reflected via a windshield (projecting member) 220 and introducing the display light L to an eye box of a driver (observer) D of the vehicle 200. It is possible for a driver D to visually recognize the virtual image V due to the display light L, in a state of being overlapped with a landscape.

Figure 2:
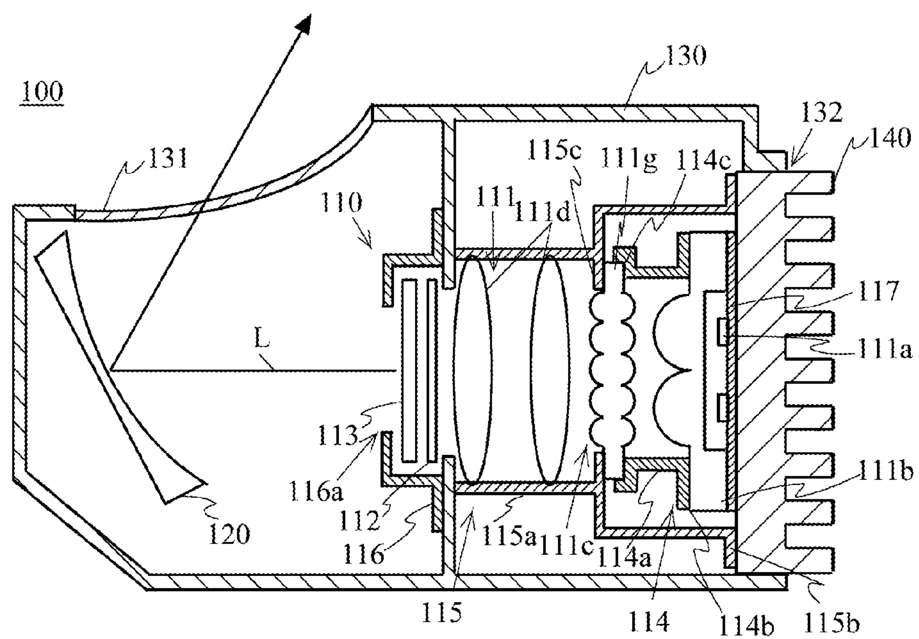
FIG. 2 is a cross-sectional view of the head-up display device of the embodiment according to the present invention.

The head-up display device 100 is mainly constituted by the liquid crystal display (display) 110, a concave mirror 120, a housing 130 and a heat-radiation member 140, as shown in FIG. 2.

The liquid crystal display 110 includes an illumination optical system 111, a light diffusion member 112, a liquid crystal display panel (display member) 113, a first case body 114, a second case body 115 and a third case body 116.

Figure 3:
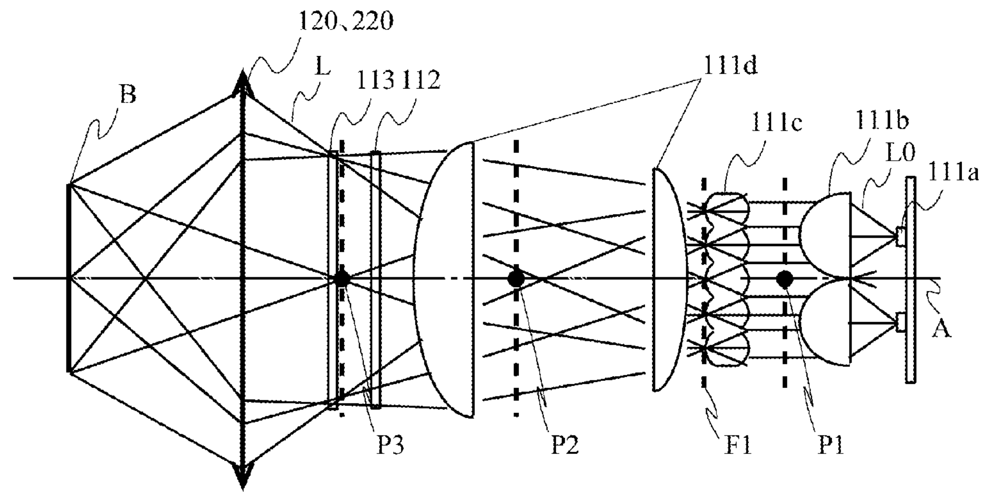
FIG. 3 is an explanatory view of optical paths in the head-up display device of the embodiment according to the present invention.

The illumination optical system 111 is a so-called Koehler illumination optical system and is constituted by a light source 111*a*, a condenser lens 111*b*, a lens array 111*c* and a field lens 111*d*, as shown in FIG. 3. In addition, the illumination optical system 111 evenly irradiates an effective area of the liquid crystal display panel 113 with a light beam L0 emitted from the light source 111*a*. Further, the illumination optical system 111 controls an angle of the display light L emitted from a surface of the liquid crystal display panel 113 such that the same light beam L0 is introduced to the eye box of a driver D via a projecting optical system constituted by the concave mirror 120 and the windshield 220.

The light source 111*a* is constituted by a light-emitting element such as an LED and emits the light beam L0. The light source 111*a* is mounted on a circuit substrate (light source substrate) 117.

The condenser lens 111*b* is constituted by a convex lens which is made of optical plastics and has a refractive index Nd of 1.4 to 1.7 in the 587.56 nm wavelength. The condenser lens 111*b* has a function of converging the light beam L0 emitted from the light source 111*a* and parallelizing the light beam L0 with respect to an optical axis A of the head-up display device 100. In the condenser lens 111*b*, lenses thereof and the light sources 111*a* are disposed in one-to-one correspondence. If a plurality of light sources 111*a* are used as in the embodiment, the condenser lens 111*b* has a collecting lens shape in which a plurality of convex lenses are disposed. An effective focal length of the condenser lens 111*b* is 5 to 9 mm. The condenser lens 111*b* may be constituted by two lenses depending on the specifications, if it is required to suppress a length (lens thickness) between vertices of curved surfaces of the lens within a certain value, from the circumstances of the lens manufacturing, for example. An emitting surface of the light source 111*a* is positioned at the focal point of the condenser lens 111*b*. Paraxial light beams emitted from the light source 111*a* become parallel with the optical axis A after transmitting the condenser lens 111*b*. In addition, an interval between a vertex of the curved surface of the condenser lens 111*b* on an incident side and the emitting surface of the light source 111*a* is defined by conditions such as a take-in amount of light from the light source 111*a* and a dimensional constraint. When the light source 111*a* has properties similar to a lambertian light distribution, a curved surface of the condenser lens 111*b* on an emitting side basically has a spherical surface. However, the curved surface thereof may have a non-spherical surface shape in correspondence with light distribution properties of the light source 111*a*.

The lens array 111*c* is an optical member formed by regularly disposing a plurality of biconvex lenses, which are made of optical plastics and have a refractive index Nd of 1.4 to 1.7 in the 587.56 nm wavelength, on a plane perpendicular to the optical axis A of the head-up display device 100. The lens array 111*c* has a function for dividing the light beam L0, which is parallelized by the condenser lens 111*b*, by the number of arrays and forming an intermediate image. The intermediate image is an image formed by dividing an enlarged image of the light source 111*a* generated by the condenser lens 111*b* by the number of arrays. By adjusting vertical and lateral widths of each lens therein, it is possible for the lens array 111*c* to optimize light distribution angles (the numerical aperture) of the light beam L0 emitted from an intermediate imaging surface by causing the light distribution angles to be different from each other in vertical and lateral directions (which are short side and long side directions of the liquid crystal display panel 113). A ratio (vertical width: lateral width) of the vertical width and the lateral width of each lens is set so as to be substantially equal to an aspect ratio (a ratio of a vertical size and a lateral size of a display screen) of the liquid crystal display panel 113. Thereby, a shape of the intermediate image generated by the lens array 111*c* is similar to that of the display screen of the liquid crystal display panel 113. Further, since the intermediate image is enlarged and irradiated on the liquid crystal display panel 113 by an action of the field lens 111*d* described below, it is possible to improve illumination efficiency when the intermediate image is irradiated on the liquid crystal display panel 113. In the lens array 111*c*, the curved surface of each lens basically has a spherical surface shape (a curved surface shape which is formed by rectangularly cutting a part of a spherical surface). However, if the curved surface has a non-spherical surface shape such as a toroidal surface, it is also possible to optimize each of the light distribution angles in vertical and lateral direction by causing each lens to have the same vertical and lateral widths. In addition, a thickness of the lens array 111*c*, namely a length between the vertices of the curved surfaces, is defined such that a curved surface at a position (this position is equal to a position of the intermediate imaging surface, from the point of view of design) where the paraxial parallel light irradiated on the lens array 111*c* is refracted and converged, is set as a curved surface on the emitting side, based on the curved surface of the lens on the incident side. Furthermore, the curved surfaces of the lens array 111*c* on the incident side and the emitting side is a combination of curved surfaces which have the same radius of curvature and direct directions opposite to each other, and are symmetric with respect to a principal plane. In addition, the vertical and lateral widths of the whole lens array 111*c* are defined so as to match with a light distribution angle of the light beam emitted onto a surface of the liquid crystal display panel 113. For, example, if the focal length of the field lens 111*d* is fixed, the light distribution angle of the light beam emitted onto the liquid crystal display panel 113 is widened corresponding to an increase of the vertical and lateral widths of the whole lens array 111*c*. Therefore, the effective curved surface size of the condenser lens 111*b* is defined after the vertical and lateral widths of the entire lens array 111*c* are determined, and the condenser lens 111*b* is designed in detail. It is unnecessary to consider the interval between the condenser lens 111*b* and the lens array 111*c*, from an optical standpoint. However, there are some cases where the interval should be set as short as possible, in consideration of downsizing in product dimensions.

The field lens 111*d* is constituted by a convex lens which is made of optical plastics and has a refractive index Nd of 1.4 to 1.7 in the 587.56 nm wavelength. In the embodiment, the field lens 111*d* is constituted by at least two convex lenses. The field lens 111*d* has a function of introducing the light beam L0 emitted from the intermediate image generated by the lens array 111*c* to the liquid crystal display panel 113 at a predetermined light distribution angle. In other words, in the illumination optical system 111, the lens array 111*c* divides the parallelized light beam L0 from the light source 111*a*, thereby generating each of the intermediate images. Then, the light beam L0 emitted from each of the generated intermediate images is enlarged by the field lens 111*d* so as to irradiate the entire surface (a plane passing through a center line of a liquid crystal layer in a thickness direction) of the liquid crystal display panel 113. Furthermore, each object point is superimposed on each other on the surface of the liquid crystal display panel 113, which is a single surface. Thereby, it is possible to improve light illumination efficiency with respect to an eye box B. Further, upon comparison with a conventional method which uses a lenticular lens and causes a light beam to spread in vertical and lateral directions after converging, brightness uniformity of the virtual image V is improved, and thus it is possible to suppress the amount of brightness change for a virtual image V affected by a movement of a viewpoint. The light distribution angle in the surface of the liquid crystal display panel 113 is calculated by reverse-ray tracing a light beam group, which combines the eye box B of the driver D with the virtual image V positioned in advance, via a projecting optical system (which is composed by the windshield 220 and the concave mirror 120, in the embodiment) of the head-up display device 100. It is preferable that an interval (an air layer) between two convex lenses constituting the field lens 111*d* have a length equal to or more than half of the effective focal length of the field lens 111*d*. The reason is as follows. When the light distribution angle (numerical aperture on an image side) in the surface of the liquid crystal display panel 113 is great, the converging degree by the field lens 111*d* is deteriorated in correspondence with the shortened length between the two convex lenses, thereby the light illumination efficiency and the brightness uniformity in the surface of the liquid crystal display panel 113 are decreased. Therefore, it is necessary to ensure a certain amount of interval between the two convex lenses, to prevent the performance deterioration. Furthermore, desirable properties of the light distribution angles on the surface of the liquid crystal display panel 113 are as follows, in most of the head-up display devices mass-produced currently. First, the light distribution angle is widened at a center point of the surface, in a concentric-circular shape with the optical axis A of the head-up display device 100 as an axis. Further, at a position away from the center point of the surface by arbitrary distance, the light distribution angle is widened outwardly with respect to the optical axis A of the head-up display device 100, in proportion to the length from the center point of the surface. In order to achieve the light distribution angle properties described above, the lens array 111*c* and the field lens 111*d* are disposed such that an intermediate imaging surface F1 of the lens array 111*c* is positioned closer to a principal point P2 side of the field lens 111*d* than a focal point P1 on a side of an object of the field lens 111*d*, in the embodiment. According to a physical law, the light beam which passes the focal point of the lens and is irradiated on the lens from the inclined direction advances in a state of being parallelized to the optical axis, after transmitting the lens. In addition, when an intersection point of the light beam radiated inclinedly and the optical axis is positioned between the principal point and the focal point of the lens, the light beam after transmitting the lens advances in a direction away from the optical axis (widened in a diverging direction). Therefore, when the intermediate imaging surface F1 of the lens array 111*c* and the focal point P1 on the side of an object of the field lens 111*d* have a positional relationship as described above, it is possible to confirm the achievement the desirable light distribution angles with respect to the head-up display device described above, theoretically. Meanwhile, a Koehler illumination optical system used to a general projector or the like causes a telecentric light beam to be introduced onto an illumination object such as a liquid crystal display panel. Thus, a Koehler illumination optical system is designed basically so that an intermediate imaging surface of a lens array is matched with a focal point on a side of an object of a field lens. From such a difference, the illumination optical system 111 of the present invention deserves to be called a unique optical system. In addition, the intermediate imaging surface F1 of the lens array 111*c* is positioned on the side of the image (a side of the virtual image V) with respect to the principal point of the lens array 111*c*. Therefore, in the specification, a concave lenticular lens or the like in which the intermediate image is positioned on the side (a side of the light source) of the object with respect to the principal point, in which the intermediate image and the focal point P1 on the side of the object of the field lens 111*d* are brought close to each other to the utmost, there is no case where a hindrance is caused in the optical design by the thickness of the lens itself generating the intermediate image. Furthermore, the field lens 111*d* is disposed so that a focal point P3 on a side of the image is substantially matched with the surface of the liquid crystal display panel 113. This position is on purpose to make the light beam group, which is emitted from each of the intermediate images generated by the lens array 111*c*, at the same angle, form an image on the surface of the liquid crystal display panel 113 by the field lens 111*d*. This position can contribute to the improvement of the uniformity in the surface of the liquid crystal display panel 113. An interval between the vertex of the curved surface of the field lens 111*d* on the emitting side and the surface of the liquid crystal display panel 113 is not limited in optical design. However, in order to dispose the light diffusion member 112 described below, it is preferable that the interval therebetween be set about 10 mm. The curved surface constituting the field lens 111*d* has a spherical shape. However, the curved surface may have a non-spherical shape to improve the converging degree in the surface of the liquid crystal display panel 113.

The light diffusion member 112 is a member having a film shape or a plate shape of which a base material is a transparent resin material. The light diffusion member 112 is disposed between the field lens 111*d* of the illumination optical system 111 and the liquid crystal display panel 113 and has a size covering an entire optical path. The light diffusion member 112 is fixed to the inside of the third case body 116 in a manner of insertion using an exterior part, adhesion or the like. The light diffusion member 112 has a function of diffusing the external light reflected by the curved surface of the field lens 111*d* on the emitting side and preventing the driver D from directly seeing a boundary portion of the intermediate image generated by the lens array 111*c* of the illumination optical system 111.

The liquid crystal display panel 113 is formed by adhering polarizing plates to both front and rear surfaces of a liquid crystal cell, which is constituted by enclosing a liquid crystal layer with a pair of transparent substrates provided with transparent electrode films. The liquid crystal display panel 113 is accommodated in the third case body 116. The light beam L0 which is introduced to the surface of the liquid crystal display panel 113 at the predetermined light distribution angle by the field lens 111*d* becomes the display light L after transmitting the liquid crystal display panel 113. Then, the display light L is irradiated on a concave mirror 120 constituting the projecting optical system.

Figure 4:
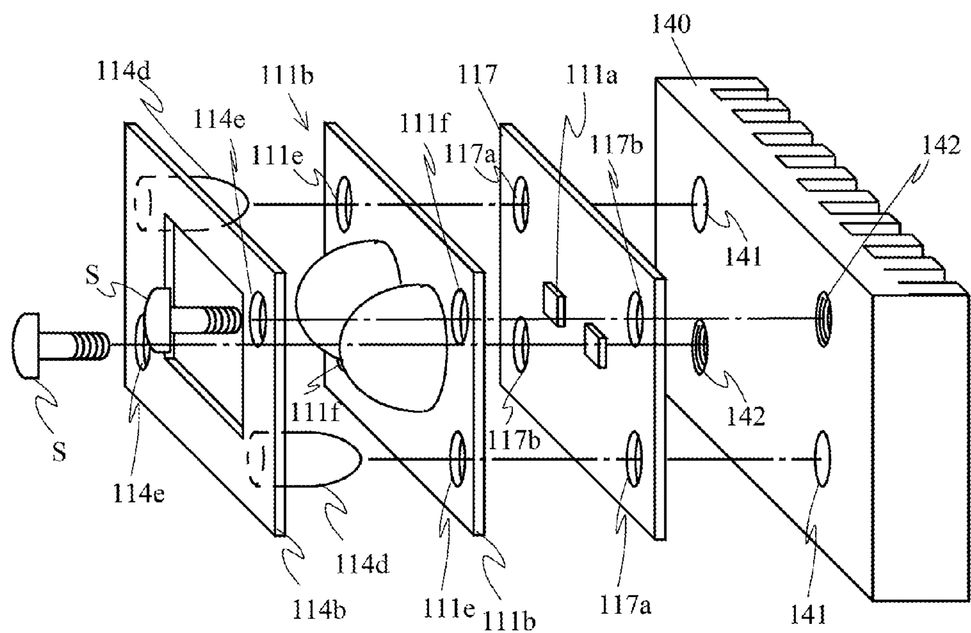
FIG. 4 is a perspective view showing a fixing method of a first case body of the head-up display device of the embodiment according to the present invention.

The first case body 114 is a cylindrical-shaped member of which a cross-section has a substantially rectangular shape. The first case body 114 is made of a non-translucent resin material and provided on a rear side of the liquid crystal display 110. Further, the first case body 114 includes a wall portion 114*a* which forms a accommodation space for accommodating the condenser lens 111*b*, a flange portion 114*b* which is extended from one end portion (an end portion on a rear side) of the wall portion 114*a* and is perpendicular to the wall portion 114*a*, and a notch portion 114*c* which is formed on the other end portion (an end portion on a front side) of the wall portion 114*a*. FIG. 4 is a view showing a fixing method of the first case body 114. In addition, only the flange portion 114*b* of the first case body 114 is illustrated in FIG. 4. In the first case body 114, two positioning pins 114*d* are provided on a rear surface of the flange portion 114*b* in a state of being positioned with high precision. When installing the first case body 114, first, the two positioning pins 114*d* are respectively passed through two positioning holes 111*e* formed on the condenser lens 111*b* and two positioning holes 117*a* formed on the circuit substrate 117. Then, the two positioning pins 114*d* are respectively inserted into two positioning holes 141 formed on a heat-radiation member 140. A positioning process of these parts is performed in this manner. The positioning holes 111*e* of the condenser lens 111*b* are positioned with high precision, with respect to the vertex of the curved surface of the condenser lens 111*b*. The positioning holes 117*a* of the circuit substrate 117 are positioned with high precision, with respect to a mounting area of the light source 111*a*. In addition, the positioning holes 111*e*, 117*a*, 141 have the same pitches between the holes and the same hole diameters. By inserting the positioning pins 114*d* into each of the positioning holes 111*e*, 117*a* and 141, the vertex of the curved surface of the condenser lens 111*b* is positioned coaxially with a center of an emitting area of the light source 111*a*. Besides, in the first case body 114, two through holes 114*e* in which screws S are inserted are provided on the flange portion 114*b*. Similarly, two through holes 111*f* in which the screws S are inserted are provided on the condenser lens 111*b*, and two through holes 117*b* in which the screws S are inserted are provided on the circuit substrate 117. The screws S are respectively screwed into two thread holes 142 formed on the heat-radiation member 140 after being inserted into the through holes 114*e*, 111*f* and 117*b*. Thereby, the first case body 114 is screwed onto the heat-radiation member 140. At this time, the circuit substrate 117 and the condenser lens 111*b* are interposed and fixed between the first case body 114 and the heat-radiation member 140. Returning to FIG. 2, a plane portion 111*g* formed on the periphery of the lens array 111*c* abuts on the notch portion 114*c* provided on the other end portion (the end portion on the front side) of the wall portion 114*a* of the first case body 114, thereby the lens array 111*c* is positioned. In addition, the lens array 111*c* is fixed at an arbitrary position by interposing the plane portion 111*g* between the first case body 114 and the second case body 115.

The second case body 115 is a cylindrical-shaped member of which a cross-section has a substantially rectangular shape. The second case body 115 is made of a non-translucent resin material and provided between the first case body 114 and the third case body 116. Further, the second case body 115 accommodates and holds the parts constituting the illumination optical system 111 therein. The second case body 115 includes a wall portion 115*a* having a stepped shape of which a width of the step on a front side is relatively narrower than that on a rear side, and a flange portion 115*b* extending on one end portion (an end portion on a rear side) of the wall portion 115*a*. A screw through hole (not shown) is provided on the flange portion 115*b*, and the second case body 115 is screwed onto the heat-radiation member 140. Furthermore, the second case body 115 has a protruding surface 115*c* abutting on the plane portion 111*g* of the lens array 111*c* when the heat-radiation member 140 is screwed onto an inner surface of the stepped portion of the wall portion 115*a*. The lens array 114 is fixed by interposing the plane portion 111*g* between the protruding surface 115*c* and the notch portion 114*c* of the first case body 114. In addition, the second case body 115 has a function for holding the field lens 111*d*. The two convex lenses constituting the field lens 111*d* are respectively fixed on the inner surfaces of the wall portion 115*a* of the second case body 115, at an interval maintained with high precision.

The third case body 116 is provided on a front side (an emitting side) of the liquid crystal display 100 and made of a non-translucent resin material. The third case body 116 accommodates the light diffusion member 112 and the liquid crystal display panel 113 therein. The third case body 120 is provided with a window portion 116*a* to expose a display surface of the liquid crystal display panel 113.

The concave mirror 120 is constituted by forming a concave-reflective surface on a resin material, such as polycarbonate, in the manner of vapor deposition using a metal, such as aluminum. The concave mirror 120 causes the display light L emitted from the liquid crystal display 110 to be enlarged and irradiated on the windshield 220.

The housing 130 is made of non-translucent resin material and accommodates the liquid crystal display 110 and the concave mirror 120 therein. The housing 130 is provided with a window portion 131 for emitting the display light. The window portion 131 is made of translucent resin material such as acrylic and has a curved shape. In addition, the housing 130 is provided with an opening portion 132 for installing the heat-radiation member 140, on the rear side thereof.

The heat-radiation member 140 is provided in the opening portion 132 of the housing 130. The heat-radiation member 140 is a fin-shaped structure made of metallic materials such as aluminum and has a function for releasing heat emitted from the light source 117 to outside. The first and second case bodies 114 and 115 are fixed on the heat-radiation member 140 in the screwed manner. Furthermore, the heat-radiation member 140 is screwed into the housing 130.

The parts described above constitute the head-up display device 100.

According to the embodiment, the lens array 111*c* which generates the plurality of intermediate images of the light source 111*a* by dividing the light beam L0 and the field lens 111*d* which causes the light beam L0 emitted from the intermediate image generated by the lens array 111*c* to be irradiated on the liquid crystal display panel 113 at a predetermined angle are provided in the illumination optical system 111. Therefore, it is possible to improve light irradiation efficiency toward the eye box B. In addition, by improving the uniformity in the virtual image V, it is possible to suppress the amount of brightness change for the virtual image V affected by a movement of a viewpoint. Furthermore, the lens array 111*c* is arranged such that the intermediate imaging surface F1 generated by the lens array 111*c* are located on the principal point P2 side of the field lens 111*d* with respect to the focal point P1 on the object side of the field lens 111*d*, thereby it is possible to obtain desirable light distribution angle properties on the surface of the liquid crystal display panel 113 in the head-up display device 100.

Further, in the embodiment, the field lens 111*d* is arranged such that the focal point P3 on the side of the image is substantially matched with the surface of the liquid crystal display panel 113. Therefore, it is possible to improve the uniformity in the surface of the liquid crystal display panel 113.

Furthermore, in the embodiment, the condenser lens 111*b* for converging the light beam L0 is arranged between the light source 111*a* and the lens array 111*c*. Therefore, it is possible to effectively converge the light beam L0 from the light source 111*a* on the lens array 111*c*. Still further, it is also possible not to provide the condenser lens 111*b* as long as the light source 111*a* emits a parallel light and has a predetermined width.

Furthermore, in the embodiment, the numerical apertures in the generated intermediate image are different from each other in a short side direction and in a long side direction of the liquid crystal display panel 113, in the lens array 111*d*. In this way, it is possible to optimize the numerical aperture in each direction. As an example of the specific methods, the lens array 111*d* is constituted by integrally disposing the plurality of biconvex lenses in which the biconvex lens is formed such that the width ratio of the long side and the short side in the effective area of the curved surface thereof is substantially equal to the aspect ratio of the display area of the liquid crystal display panel 113. Thereby, it is possible to respectively optimize the numerical aperture in the vertical direction and the lateral direction.

Further, in the embodiment, the field lens 111*d* is constituted by at least two convex lenses, and the air layer is provided between the convex lenses so as to have a length equal to or more than half of the effective focal length of the field lens 111*d*. Thereby it is possible to easily provide a field lens 111*d* having a high converging degree. In addition, if the ease of manufacturing is not considered, it is possible to constitute the field lens 111*d* by a single convex lens.

Still further, in the embodiment, the light diffusion member 112 is disposed between the field lens 111*d* and the liquid crystal display panel 113. Thereby, the external light reflected by the curved surface of the field lens 111*d* on the emitting side is diffused, and it is possible to prevent the driver D from directly seeing a boundary portion of the intermediate image generated by the lens array 111*c* of the illumination optical system 111. Therefore, it is possible to improve the display quality of the head-up display device 100.

In addition, in the embodiment, the first case body 114 which is formed with the circuit substrate 117 mounted with the light source 111*a* and the positioning pin 114*d* is provided. Additionally, the through holes 117*a* and 111*e* are provided at positions where the light source substrate 117 and the condenser lens 111*b* face each other. Further, the light source substrate 117 and the condenser lens 111*b* are constituted so as to cause the positioning pin 114*d* to be inserted into the through holes 117*a* and 111*e* and be interposed between the first case body 114 and the heat-radiation member 140 disposed on a rear surface side of the light source substrate 117. Thereby, it is possible to easily position the light source 111*a* and the condenser lens 111*b* with high precision. Furthermore, in the embodiment, the second case body 115 for holding the field lens 111*d* is provided, and the lens array 111*c* has the plane portion 111*g* on the end portion thereof. In addition, the plane portion 111*g* is interposed between the first case body 114 and the second case body 115, thereby it is possible to easily arrange and fix the lens array 111*c*.

INDUSTRIAL APPLICABILITY

The present invention is suitable for a head-up display device.

REFERENCE SIGNS LIST

100: head-up display device
110: liquid crystal display
111: illumination optical system
111*a*: light source
111*b*: condenser lens
111*c*: lens array
111*d*: field lens
112: light diffusion member
113: liquid crystal display panel (display member)
114: first case body
115: second case body
116: third case body
117: circuit substrate (light source substrate)
120: concave mirror
130: housing
140: heat-radiation member

The invention claimed is:

1. A head-up display device which displays a virtual image by introducing a display light, which is emitted from a display provided with an illumination optical system and a display member, to a viewpoint area of an observer via a projecting member, the illumination optical system which is a Koehler illumination optical system including:

a light source for emitting a light beam, a lens array for generating a plurality of images of the light source by dividing the light beam, and a field lens for irradiating on the display member at a predetermined angle the light beam emitted from the images of the light source, which is generated by the lens array, wherein the lens array is arranged such that the imaging surface of the light source generated by the lens array is located on a side of a principal point of the field lens with respect to a focal point on a side of an object of the field lens, and the field lens is constituted by at least two convex lenses, and an air layer is provided between the convex lenses so as to have a length equal to or more than half of an effective focal point length of the field lens.

2. The head-up display device according to claim 1, wherein the field lens is arranged such that a focal point on a side of an image is substantially matched with a surface of the display member.

3. The head-up display device according to claim 1, wherein a condenser lens is arranged between the light source and the lens array to converge the light beam.

4. The head-up display device according to claim 1, wherein, in the lens array, numerical apertures in the generated image of the light source are different from each other in a short side direction and in a long side direction.

5. The head-up display device according to claim 1, wherein the lens array is constituted by integrally disposing a plurality of biconvex lenses, and the biconvex lens is formed such that a width ratio of a long side and a short side in an effective area of a curved surface thereof is substantially equal to an aspect ratio of a display area of the display member.

6. The head-up display device according to claim 1, wherein a light diffusion member is arranged between the field lens and the display member.

7. The head-up display device according to claim 3, wherein a first case body which is formed with a light source substrate mounted with the light source and a positioning pin is provided, a through hole is provided at a position where the light source substrate and the condenser lens face each other, and the light source substrate and the condenser lens are configured so as to cause the positioning pin to be inserted into the through hole and be interposed between the first case body and a heat-radiation member arranged on a rear surface side of the light source substrate.

8. The head-up display device according to claim 7, wherein a second case body for holding the field lens is provided, the lens array has a plane portion on an end portion thereof, and the plane portion is interposed between the first case body and the second case body.

9. A head-up display device which displays a virtual image by introducing a display light, which is emitted from a display provided with an illumination optical system and a display member, to a viewpoint area of an observer via a projecting member, the illumination optical system including:

a light source for emitting a light beam, a lens array for generating a plurality of images of the light source by dividing the light beam, and a field lens for irradiating on the display member at a predetermined angle the light beam emitted from the images of the light source, which is generated by the lens array, wherein the lens array is arranged such that the imaging surface of the light source generated by the lens array is located on a side of a principal point of the field lens with respect to a focal point on a side of an object of the field lens, and the field lens is constituted by at least two convex lenses, and an air layer is provided between the convex lenses so as to have a length equal to or more than half of an effective focal point length of the field lens.

10. A head-up display device which displays a virtual image by introducing a display light, which is emitted from a display provided with an illumination optical system and a display member, to a viewpoint area of an observer via a projecting member, the illumination optical system including:

a light source for emitting a light beam, a lens array for generating a plurality of images of the light source by dividing the light beam, and a field lens for irradiating on the display member at a predetermined angle the light beam emitted from the images of the light source, which is generated by the lens array, wherein the lens array is arranged such that the imaging surface of the light source generated by the lens array is located on a side of a principal point of the field lens with respect to a focal point on a side of an object of the field lens, a condenser lens is arranged between the light source and the lens array to converge the light beam, a first case body which is formed with a light source substrate mounted with the light source and a positioning pin is provided, a through hole is provided at a position where the light source substrate and the condenser lens face each other, the light source substrate and the condenser lens are configured so as to cause the positioning pin to be inserted into the through hole and be interposed between the first case body and a heat-radiation member arranged on a rear surface side of the light source substrate, and a second case body for holding the field lens is provided, the lens array has a plane portion on an end portion thereof, and the plane portion is interposed between the first case body and the second case body.

* * * * *